R. C. SHINDLER.
TRACTION WHEEL.
APPLICATION FILED MAY 6, 1913.
1,099,825.
Patented June 9, 1914.
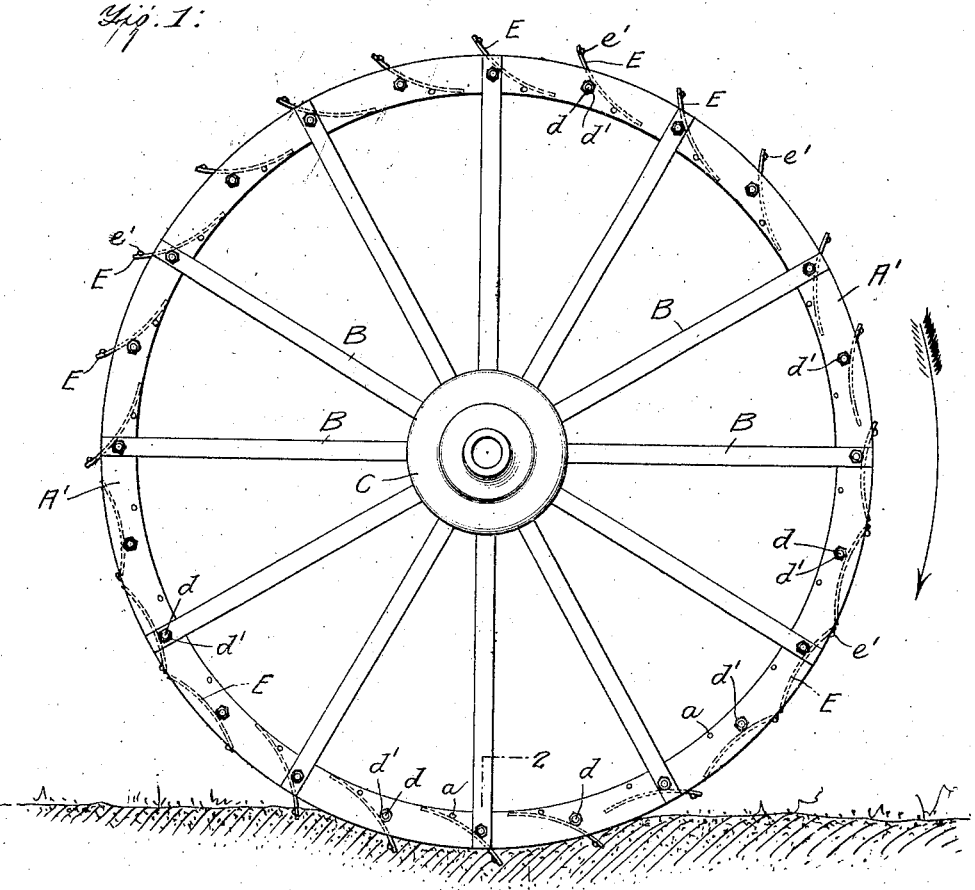
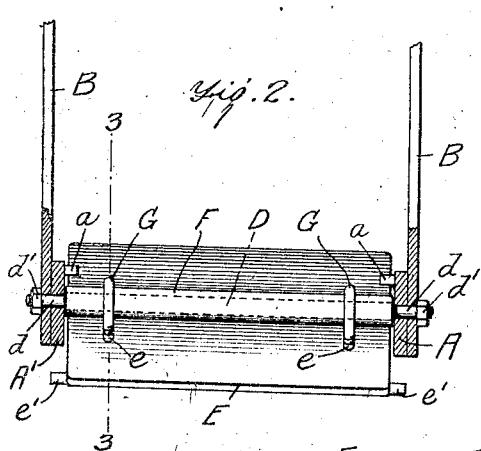
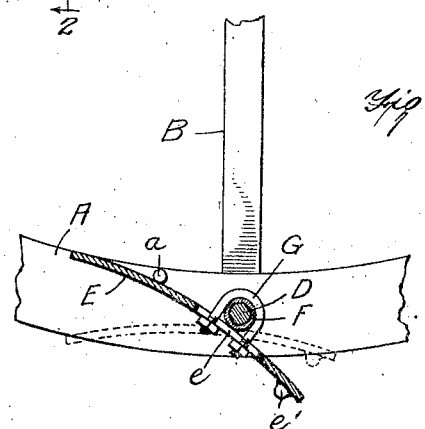
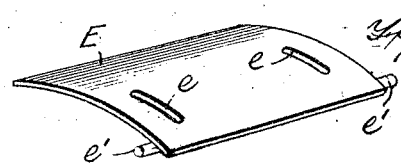
WITNESSES
INVENTOR
ROBERT C. SHINDLER,
BY Munn & Co.
ATTORNEYS

UNITED STATES PATENT OFFICE.

ROBERT CONRAD SHINDLER, OF DALHART, TEXAS.

TRACTION-WHEEL.

1,099,825.  Specification of Letters Patent.  Patented June 9, 1914.

Application filed May 6, 1913. Serial No. 765,824.

*To all whom it may concern:*

Be it known that I, ROBERT CONRAD SHINDLER, a citizen of the United States, and a resident of Dalhart, in the county of Dallam and State of Texas, United States of America, have made a new and useful Improvement in Traction-Wheels, of which the following is a specification.

This invention relates to traction wheels and more particularly to a traction wheel of that type in which tractor plates or members are carried by a wheel rim for the purpose of providing an effective grip for the wheel when passing over a soft traction surface.

The object of the present invention is to provide certain improved tractor members or plates which, when properly mounted between annular rim plates of a wheel, will operate to form the tractive surface of the wheel when passing over a hard traction surface, and to automatically project at one end when the wheel passes over a soft traction surface in order to effect a satisfactory grip and prevent the wheel from slipping.

The means by which the above objects are accomplished are shown in the accompanying drawings, in which—

Figure 1 is a side elevation of my improved wheel, Fig. 2 is a radial section through the rim of my improved wheel, taken substantially on line 2—2 of Fig. 1, Fig. 3 is a vertical section taken substantially on line 3—3 of Fig. 2, and Fig. 4 is a perspective view of one of the tractor plates removed.

Referring now to these figures, my invention is adapted to a wheel, the rim of which is formed by a pair of spaced annular rim plates A and A', to which are connected the outer ends of the spokes B, the latter as usual radiating from the hub C. At equal distantly spaced points therearound, the rim plates A and A' are connected by transverse bolts D, the reduced ends $d$ of which are extended through the rim plates as particularly shown in Fig. 2 and secured by nuts $d'$ threaded upon their extremities.

The tractor plates E, one of which is associated with each of the bolts D, before mentioned, consist of a plurality of curved plates, having longitudinal slotted openings $e$ adjacent their opposite side edges and formed nearer to one end than to the other as particularly shown in Fig. 4, the end of the plates nearest the slotted openings $e$ being provided with laterally projecting side lugs $e'$.

Loosely disposed upon each of the bolts D between the before mentioned rim plates are sleeves F, and to these sleeves the tractor plates E are connected by means of U-bolts G, the extremities of which are secured through the slotted openings $e$, as will be seen by reference to Figs. 2 and 3.

The several tractor plates E are positioned so that their shorter ends project forwardly with respect to the direction of movement of the wheel, these shorter ends of the tractor plates being prevented from moving inwardly beyond the outer peripheral edge of the rim plates owing to the lugs $e'$, which are adapted to engage the rim plates and thus act as stops.

As will be seen from the several figures, the rim plates A and A' are provided around their inner peripheral edges with inwardly projecting stop lugs $a$, located adjacent the bolts D and adapted to limit the inward movement of the longer ends of the tractor plates as particularly shown in Fig. 3.

Thus from the foregoing, it will be seen that the several tractor plates E are free to rock on the bolts D which support the same and may thus assume a position substantially tangential to the wheel when the latter passes over a hard traction surface, this position being indicated in dotted lines in Fig. 3, from which it is apparent that the tractor plates coöperate with the rim plates in forming the tractive surface of the wheel. When, however, the wheel passes over a soft traction surface, the inner ends of the tractor plates, being wholly exposed between the rim plates, will be acted on and pressed inwardly until they engage the stop lugs $a$, resulting in an angular position of the tractor plates in which their shorter ends are projected outwardly and engage the soft traction surface whereby to effectively grip the same and prevent the wheel from slipping.

It will be seen that the action of the tractor plates in the connection before stated is wholly automatic, and that they are strongly supported and will be effective and durable in use.

I claim:—

1. A traction wheel having spaced annular rim plates, and free moving tractor plates pivotedly mounted intermediate their ends and nearer to one end than to the other, between the said rim plates, and extending lengthwise circumferentially of the wheel in the space between the rim plates whereby both ends of the tractor plates will be subject to the action of a soft traction surface over which the wheel passes.

2. A traction wheel having spaced annular rim plates, bolts connecting the said rim plates at equidistantly spaced points therearound, sleeves loosely disposed on the said bolts, and tractor plates connected intermediate their ends to the said sleeves and movable on the bolts.

3. A traction wheel having spaced annular rim plates, bolts connecting the said plates at equidistantly spaced points therearound, sleeves loosely disposed on the said bolts, tractor plates having intermediate longitudinal slots adjacent their side edges, and U-bolts for connecting said tractor plates with the said sleeves, said U-bolts passing around the sleeves and having their extremities secured through the slots in the tractor plates.

4. A traction wheel having spaced annular rim plates, and tractor plates pivotedly mounted intermediate their ends between the rim plates and wholly exposed at both ends there between, said rim plates and said tractor plates being provided with stop lugs whereby to limit the pivotal movement of the tractor plates in opposite directions.

5. A traction wheel having spaced annular rim plates, free moving tractor plates pivotally mounted intermediate their ends and nearer to one end than to the other, at points between the rim plates, and extending lengthwise circumferentially of the wheel in the space between the rim plates whereby both ends of the tractor plates will be subject to the action of a soft traction surface over which the wheel passes, and means whereby to limit inward movement of the longer end of each tractor plate, all for the purpose described.

ROBERT CONRAD SHINDLER.

Witnesses:
W. H. LATHEM,
J. S. BAILEY.